Aug. 11, 1942.　　　　R. ABRAHAMSON　　　　2,292,425
RHEOSTAT
Filed April 24, 1940
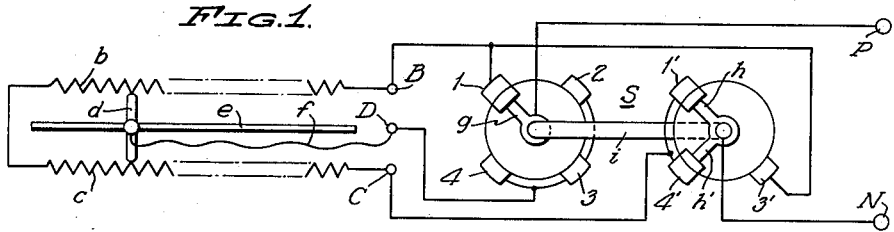
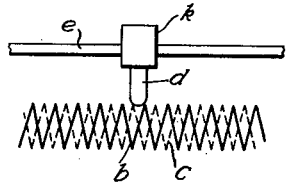
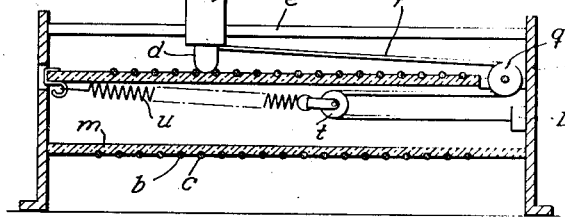
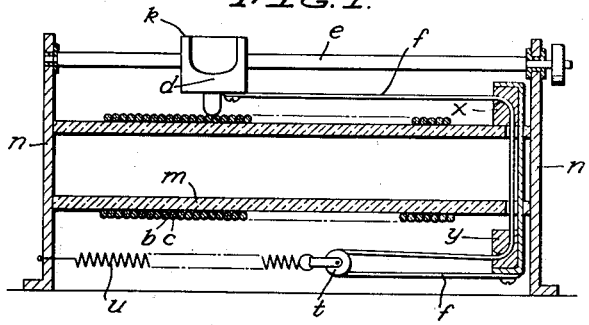
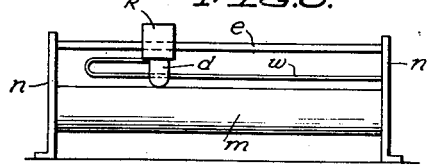
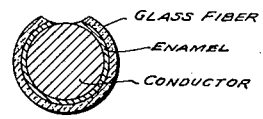
INVENTOR.
ROBERT ABRAHAMSON
BY
ATTORNEYS.

Patented Aug. 11, 1942

2,292,425

UNITED STATES PATENT OFFICE 2,292,425

RHEOSTAT

Robert Abrahamson, Forest Hills, N. Y.

Application April 24, 1940, Serial No. 331,307

11 Claims. (Cl. 201—62)

My invention relates to variable electric resistance devices, in particular to rheostats, having a slide contact for varying the effective length of a resistance conductor.

An object of my invention is to provide a resistance device of high accuracy and of a relatively large resistance or regulating range, in particular for use in laboratories, or for measuring purposes in general.

Another object of my invention is to provide a resistance unit of the rheostat type which allows changing the resistance or regulating range so as to suit various measuring conditions while requiring a minimum number of resistance conductors.

A further object in conjunction with the foregoing is to provide a rheostat or the like which, while having only one movable contact or slide and only one of the conventional tubular insulators for carrying the resistance windings proper, allows selecting one of four or more different resistance ranges.

Another object of my invention is to facilitate the changing over from one to another resistance or regulating range of a multiple rheostat.

An object also is the provision of multiple scale means which automatically indicate the operative regulating range to which a multi-range resistance device is adjusted.

A still further object, which is of significance in connection with resistance devices of high accuracy for laboratory purposes and the like, is the elimination of the intermediate, frictional or sliding contact between the movable slide member of a rheostat and the stationary terminal connected therewith.

According to my invention, a plurality of resistance conductors, i. e., at least two such conductors, are arranged in a fixed spatial relation to one another and are contacted by a common slide contact so that when moving the contact, the effective lengths of both or all of the resistance conductors are changed simultaneously. The resistance conductors are connected with one another and are provided with contact means that allow selectively supplying the operating current to any one individual conductor or to combinations of the conductors in order to adjust the device to different resistance ranges. According to an essential feature of my invention, the resistance conductors of the device have a different resistance per unit of length so that the measuring ranges obtained in the just-explained manner are all different from one another. According to another feature of my invention, representing a preferred embodiment, the resistance conductors have the same diameter and preferably the same number of turns but consist of materials of different specific resistance. According to another feature of my invention, the resistance conductors are arranged on one common insulating and heat-resistant carrier and form intertwined windings, the adjacent turns of which are simultaneously contacted by the contact slide of the rheostat. An essential feature also is the use of enamel-covered resistance wires having a spun fibre glass insulation sheathing the enamel cover.

Other objects and features of my invention will be apparent from the following description of the embodiments shown in the accompanying drawing, in which—

Figure 1 shows a circuit diagram of a complete resistance device according to my invention.

Figure 2 shows a schematical illustration of a different arrangement of the resistance conductors.

Figure 3 is a perspective view of a complete resistance device designed in accordance with Figure 2.

Figure 4 is a diagrammatic representation of a part-sectional side elevation showing details of the device exemplified by Figures 2 and 3.

Figure 5 shows a portion of a different embodiment, also in a part-sectional side elevation, while Figure 6 serves to explain a detail of the arrangement illustrated in Figure 5.

Figure 7 illustrates a longitudinal section through a further embodiment, and

Figure 8 a side elevation of still another example.

Figure 9 is a cross-sectional view of the resistance wire.

The resistance device represented by Figure 1 is provided with two resistance conductors $b$ and $c$ of equal length but of different resistance per unit of length. Conductor $b$ may have a resistance of 50 ohms and conductor $c$ a resistance of 100 ohms, for instance. This difference in resistance may be obtained by using materials of different specific resistance, for instance, constantan for conductor $b$ and a chrome-nickel alloy for conductor $c$. However, both conductors may also consist of the same material in order to have both the same temperature coefficient of resistance. In the latter case the difference of resistance is obtained by giving the conductors different cross sections. The two resistance conductors are series connected. They are arranged in a fixed spatial relation to each other and are both engaged by a slide contact $d$ which is movable along a slide bar $e$. The free ends of the conductors $b$ and $c$ are connected with terminals B and C, while the slide contact $d$ is connected with a stationary terminal D through a flexible conductor $f$.

S represents a switch which serves to select the measuring or resistance range of the resistance combination. The switch S is connected between the current supply terminals P, N, and the terminals B, C and D of the resistance combination. The switch exemplified in Figure 1 has two rotary contact members $g$ and $h$ which are insulated from each other and mechanically connected by the shaft $i$ of the switch. These rotary contacts $g$ and $h$ are connected with the supply terminals P and N, respectively. The stationary contacts 1 and 3' are connected with terminal B, the stationary contacts 2, 3 and 4 are connected with one another and with terminal D, and the contacts 1' and 4' are in connection with terminal C. The rotary contact $h$ has a second contact segment $h'$ so that in a certain position the two stationary contacts 3' and 4' are bridged and both connected with the supply terminal N and with terminals B and C.

The resistance device operates as follows: In the illustrated position of switch S, the supply terminal P is connected through rotary contact $g$ and stationary contact 1 with terminal B, while the supply terminal N is connected through rotary contact $g'$ and stationary contacts 1' and 4' with terminal C. Consequently, in this position of the switch, the two resistance conductors $b$ and $c$ are series connected so that a total resistance of 150 ohms is effective. The maximum current of this series connection is about 1.9 amps. By moving the slide contact $d$ along slide bar $e$, the portions of conductors $b$ and $c$ at the left-hand side of the slide $d$ are short-circuited and therefore rendered ineffective. By moving the slide contact $d$ along the slide bar $e$, the effective resistance of the unit may be varied between zero and 150 ohms.

When operating the switch S so as to move the rotary contacts $g$ and $g'$ one switching step in clockwise direction, the terminal P is connected through rotary contact $g$ with stationary contact 2 and thereby with the terminal D of slide contact $d$, while the rotary contact $h'$ comes into engagement with stationary contact 1, and thereby maintains the conductive connection between the terminals N and C. In this second position of the switch, only the resistance conductor $c$ is inserted into the circuit. Consequently, by moving the slide contact $d$, the effective resistance may be varied between zero and 100 ohms. The maximum current of the resistance unit now is about 2.3 amps.

When rotating the switch S in the clockwise direction by a further switching step, the rotary contact $g$ engages the stationary contact 3 and thus maintains the connection between terminals P and D. The same switching step brings the rotary contact $h$ into engagement with the stationary contact 3' and thereby connects terminal N with terminal B. In this third position of the switch, only the resistance conductor $b$ is inserted into the circuit. The maximum resistance now is 50 ohms, which corresponds to a maximum current of about 3.3 amps.

By operating the switch a fourth time, the rotary contact $g$ comes into engagement with stationary contact 4 which however does not change the conductive connection between the terminals P and D. The same switching operation brings contact $h$ into engagement with the stationary contact 4' while the contact segment $h'$ comes into contact with the stationary contact 3'. Consequently, in this fourth position of the switch, the supply terminal N is connected through $h$, $h'$ and 3', 4' with both terminals B and C. This adjustment establishes a short circuit between terminals B and C so that both resistance conductors B and C are effective, this time, however, in a parallel arrangement. The total resistance of the resistance unit now is about 33 ohms, which corresponds to a maximum current of about 4 amps.

The foregoing description shows that a resistance unit according to the invention may be adapted to four different resistance ranges merely by changing the connections of the supply conduits with the three terminals of the resistance arrangement proper. The four ranges above exemplified correspond to four different rheostat units of conventional type, so that the invention allows using only one unit instead of the four rheostats heretofore necessary. By using three star-connected resistance conductors of different resistance per unit of length, a still greater number of different ranges may be obtained.

It is to be understood that the circuit elements shown in Figure 1 are all associated with one another and preferably arranged on one common carrying structure. While the circuit diagram in Figure 1, for the sake of clarity, shows the two resistance conductors $b$ and $c$ spaced from each other, I prefer placing them on one common insulating body, for instance on an insulating and heat-resistant tube of conventional type. The resistance arrangement then has the appearance schematically shown in Figure 2. In this figure, $k$ represents the body of the slide contact to be operated by hand. The two resistance conductors $b$ and $c$ are helically wound onto a common insulator so as to form intertwined or, preferably, bifilar windings. The contact member $d$ of the slide contact is so designed that it simultaneously engages at least two adjacent turns, one of conductor C and the other of conductor $c$. The tubular carrier of the resistance conductors is not illustrated in Figure 2 but is apparent from Figure 4 or 5 where it is denoted by $m$.

The just-mentioned arrangement with two resistance conductors, wound one between the turns of the other over the entire utilized surface of the heat-resistant carrier, has not only obvious advantages with respect to spatial and constructional and fabricatory economy, but also represents the following improvement as to operation and efficiency. The loading capacity (watt capacity) of a rheostat depends on its permissible maximum temperature. This temperature, if the resistance conductor is uniformly distributed over the peripheral surface of the insulating tubular carrier, is virtually determined only by the thermal properties of the materials employed and by the dimensions of the just-mentioned peripheral surface of the resistance carrier. Consequently, the permissible maximum temperature and therewith the loading or watt capacity (wattage) of the unit is substantially independent of the number of turns or separate windings and also independent of their cross section. Hence, in each of the four regulating ranges, the same full watt capacity of the rheostat may be utilized. An advantage of all the embodiments here described also is that in each regulating range the slide contact is used over its entire available distance of travel.

It is evident that the applicability of the afore-described features of the invention is not necessarily confined to rheostats with a rectilinear slide path, but that they may also be employed with resistance devices in which the slide contact effects another, for instance, rotary movement.

According to Figure 4, the tubular insulator $m$ carrying the resistance conductors $b$ and $c$ is supported by a metal structure or casing $n$ which also carries the slide bar $e$. The arrangement of the supply terminals P and N and of the switch S is apparent from Figure 3. This figure indicates that a resistance unit according to the invention is similar in appearance to conventional one-conductor rheostats and does not occupy more space than the conventional units. The inleads of the current to be regulated are connected to the terminals P and N, and after the rotary switch S has been adjusted to the desired measuring or resistance range, the handle K of the slide contact is shifted into the proper position.

As illustrated in Figure 3, the slide $k$ is provided with a pointer $p$ which moves along a scale in order to indicate the effective resistance adjusted by the slide contact. According to the present invention, the resistance unit is provided with a multiple scale and with means for automatically selecting one of the scales in accordance with the resistance range adjusted by the switch S. In the embodiment shown in Figure 3, a prismatic rod $r$ is journalled between the end plates of the casing $n$ in alinement with the shaft of the switch S. The prismatic rod $r$ is so connected with the shaft of the switch that it participates in the rotary switching movement. Each of the four sides of the rod $r$ is provided with a different scale so that merely by operating the switch S a measuring range is selected and at the same time the scale appertaining to this measuring range is placed below the pointer $p$ of the slide $k$.

As resistance devices according to the invention are of particular advantage for use in laboratories for measuring and regulating purposes, where a high accuracy is desired, it is frequently important to eliminate any possible source of inaccuracy or disturbance. The conventional rheostats are as a rule so designed that the terminal for supplying current to the slide contact is connected with the slide bar along which the contact is movable. These known structures thus require an intermediate frictional contact between the movable slide and the slide bar. Such an intermediate frictional or pressure contact is apt to vary its resistance and thus affects the resistance adjustment, in particular in cases where a very small resistance is adjusted, or where the rheostat is exposed to oxidation, dust, or both. According to another known construction of rheostats, the terminal for connecting the slide contact into the circuit is mounted on the slide contact itself and thus eliminates an intermediate pressure or frictional contact. However, this arrangement requires a loosely hanging supply lead and thus is unsatisfactory for many uses. It is also known to avoid the defects here mentioned by supplying the current to a movable contact with the aid of a spring. While such constructions may be satisfactory in the case of small rheostats with rotating contact, they are disadvantageous for rheostats where a straight movement of the slide contact is required or where the movement of the slide extends over a relatively great distance. Besides, in known constructions containing a spring for supplying current to the movable slide contact, the spring is apt to consume additional space and to affect the correct adjustment of the resistance by varying its resistance, for instance, when adjacent turns of the spring come into or out of contact with respect to one another.

In contrast to these known constructions, the present invention provides a flexible conductor $f$ between the slide contact $d$ and the stationary terminal D, as is schematically indicated in Figure 1 of the drawing, together with means for maintaining the conductor $f$ in taut condition. These means are designed as follows:

According to Figure 4, the flexible conductor $f$, consisting for instance of a braided wire or ribbon, for instance of constantan, passes from the slide contact $d$ over a pulley or sheave $q$ into the bore of the insulator $m$. The pulley $q$ is stationarily journalled in a slot in the wall of the insulator $m$. A second pulley $t$ engages the conductor $f$ and has a movable sheave block under the action of a spring $u$. The pulley arrangement thus tends to keep the wire $f$ taut. When moving the slide contact $d$ along the slide bar $e$, the wire $f$ is more or less drawn into the interior of the tubular insulator $m$, depending upon the position of the slide contact. Figure 4 indicates that the connecting wire $f$ is always kept in a position where its different portions cannot contact each other. It is further apparent that the spring $u$ does not participate in the conduction of current so that it remains of no concern to the adjusted resistance whether or not the turns of the spring contact one another. It will further be noted that the maximum expansion of the spring $u$ is only half the maximum distance travelled by the slide contact $d$, so that a relatively short spring can be used which does not require additional space, without the spring being apt to be over-stressed.

The modification shown in Figure 5 differs from that of Figure 4 by employing a connecting conductor $f'$ of special construction which allows eliminating the pulley arrangement as well as the spring $u$. The connecting conductor $f'$ shown in Figure 5 consists of a wire which is wound up in narrow helical turns, as apparent from the fragment illustrated in Figure 6. Such conductors are known for other purposes. They have the appearance of a compact rod of relatively great stiffness, but bend elastically if the bending force exceeds a certain minimum. The rods are capable of being bent with a relatively great curvature without being stressed beyond the elasticity limit of the material. They therefore return immediately into their straight condition when the bending force ceases to act. The bending of the conductor $f'$ is effected by means of a guidance $v$ consisting of a tubular body, substantially U-shaped, whose inner surface is sufficiently hard and smooth to guide the conductor $f'$ without causing excessive friction. The guiding body $v$ may consist of glazed porcelain, glass, or of a hard metal. When moving the slide contact in the arrangement of Figure 5, the flexible conductor $f'$, due to its inherent elasticity with respect to bending forces, behaves rather the same as the conductor $f$ in the pulley arrangement shown in Figure 4.

The embodiment shown in Figure 7 is similar to that of Figure 4, except for the following modifications: The spring $u$ and the pulley $t$ biased by the spring are arranged outside of the insulating carrier $n$ so that they lie underneath the carrier at the side opposite from the slide bar $e$. Instead of using a stationary roller for guiding the flexible conductor $f$ from the slide contact around the pulley $t$, the embodiment of Figure 7 is provided with guiding blocks $x$ and $y$ of vulcanized fibre material or the like. The guiding blocks are provided with proper channels or guiding surfaces. Experience has shown that such blocks are sufficient to ensure a satisfactory operation, although the arrangement is simpler and less intricate than a pulley arrangement of the type shown in Figure 4. The embodiment just described has the further advantage over that of Figure 4 that the spring $u$ is not affected by the heat developed inside of the tubular carrier $m$. As a result, the arrangement illustrated by Figure 7 remains operative even if an ordinary steel spring is used and even if the rheostat is under maximum load for an extensive period of time.

The rheostat shown in Figure 8 is in some respects similar to that of Figure 5. As in the aforedescribed rheostat according to Figure 5, a flexible supply conductor $w$ is employed, which conductor has a certain stiffness against bending forces but permits being sharply deflected if the bending force exceeds a certain limit. The supply conductor in the arrangement according to Figure 8 consists of a ribbon of arcuate cross section and of elastic material. Such a ribbon has the tendency to remain in straight position. The ribbon passes through a guiding opening in the contact member $d$ and thereby is maintained in freely suspended condition.

It will be seen from the foregoing description of the embodiments illustrated in Figures 4, 5, 7 and 8, that in these modifications according to the invention, the slide bar $e$ serves only for supporting and guiding the slide member $k$ but does not participate in carrying the electric current. Consequently, these embodiments allow using a slide bar $e$ which consists of insulating material or which is provided with an insulating cover, such as an iron rod covered with vitreous enamel.

In rheostats according to the present invention, in particular in such modifications whose different resistance conductors are disposed on a common heat-resistant carrier, the entire operating voltage may under certain conditions appear between two adjacent turns. This is the case, for instance, if the two resistance windings $b$ and $c$ are operative in series connection so that the total voltage appears between the adjacent turns near the outer ends of the series arrangement. In view of this condition, it is preferable to provide a good insulation of the resistance windings with respect to each other. According to the invention, resistance conductors which are insulated by a glass fibre insulation are especially suitable. When using resistance wires which are covered with an enamel insulation and provided with an additional insulation of spun glass fibre, this glass insulation surrounding the enamel, as shown in Fig. 9 extremely high disruptive voltages are obtained. Especially high disruptive voltages of, for instance, about 6000 volts are obtained. The resistance wires are provided with such an insulation, and after they have been mounted on the heat-insulating carrier, the insulation is partly ground off along the path of travel of the slide contact.

I claim:
1. A variable electric resistance device, comprising an insulating carrier, a plurality of resistance conductors of different resistance per unit of length arranged on said carrier, said conductors being interconnected to form a resistance circuit, a contact member movable relatively to said resistance conductors and arranged to engage said conductors simultaneously so as to short-circuit a variable portion of said resistance circuit for controlling its effective total resistance, terminals for supplying current to said resistance circuit, a selector switch interposed between said terminals and said resistance circuit and connected with said conductors and said movable contact member for selectively connecting said terminals with said different individual conductors and with a combination thereof in order to change the effective resistance range of the variable resistance device, and indicating means including a pointer associated with said movable member and an adjustable scale carrier having a plurality of scales coextensive with the path of movement of said contact member, said scale carrier being connected with said switch so as to selectively place one of said scales in relation to said movable contact member and pointer depending upon the resistance range selected by said switch.

2. A variable resistance device comprising in combination, an insulating carrier, a plurality of resistance windings of different resistance per unit of length arranged side by side on said carrier in interwound turns, a slide contact movable along said carrier and arranged to simultaneously engage a group of adjacent turns of said windings for controlling the effective resistance of the device, terminals for supplying current to said windings, and selective contact means arranged between said terminals, said windings and said slide contact for selectively connecting said windings singly or in combination with said terminals in order to change the range of resistance controlled by said slide contact.

3. A variable resistance device comprising in combination, an insulating carrier, two substantially coextensive resistance conductors of different resistance per unit of length connected in series with each other and arranged side by side on said carrier so as to form a bifilar winding, a slide contact movable along said carrier and arranged to simultaneously engage adjacent turns of said conductors, terminals for supplying current to said conductors, and contact means for selectively connecting said terminals with a different one of said conductors and with the series-connection including both conductors.

4. A variable resistance device comprising in combination, an insulating carrier, two resistance windings of different specific resistance and different resistance range disposed on said carrier in interwound turns, a slide contact movable along said carrier and arranged to simultaneously engage adjacent turns of said windings for controlling the effective resistance of the device, terminals for supplying current to said windings, and selective contact means arranged between said terminals and said conductors and said slide contact for selectively connecting said conductors singly and in combination with said terminals in order to vary the resistance range controlled by said slide contact.

5. A variable resistance device comprising in combination, an insulating carrier, two resistance conductors of different specific resistance and different resistance range disposed on said carrier in interwound windings and connected in series with each other, a slide contact movable along said carrier for simultaneously engaging adjacent turns of said conductors, terminals for supplying current to said conductors, a switch disposed between said terminals and said conductors and slide contact for selectively connecting either conductor and both conductors in series and parallel relation to each other with said terminals so as to permit adjusting four different resistance ranges, and indicating means including a pointer associated with said slide contact and a rotary scale member having four scales and extending along said carrier, said member being connected with said switch so as to be adjusted automatically in accordance with the resistance range selected by means of said switch.

6. In a rheostat comprising a tubular insulator, a resistance winding disposed on the outer surface of said insulator, and a slide contact disposed outside of said insulator to engage said winding and movable along said insulator, the combination of a current supply conductor having one end fixed and the other end connected with said movable slide contact, said fixed end being arranged in said tubular insulator, and guiding means forming a passage for said supply conductor through the wall of said tubular insulator.

7. In a rheostat comprising a tubular insulator, a resistance winding disposed on the outer surface of said insulator, and a slide contact disposed outside of said insulator to engage said winding and movable along said insulator, the combination of a current supply conductor having one end fixed and the other end connected with said movable slide contact, said fixed end being arranged in said tubular insulator, a roller arranged near one end of said insulator for guiding said supply conductor on its passage from the outside into the interior of said insulator, a movable roller arranged within said tubular insulator and engaging said supply conductor so as to form a pulley mechanism, and a spring disposed within said insulator and connected with said movable roller to keep said supply conductor taut.

8. In a rheostat comprising a tubular insulator resistance winding disposed on the outer surface of said insulator, and a slide contact disposed outside of said insulator to engage said winding and movable along said insulator, the combination of a current supply conductor having one end fixed and the other end connected with said movable slide contact, said fixed end being arranged in said tubular insulator, said supply conductor consisting of a rod-shaped helical structure of limited resistance to bending stresses and capable of flexible bending when stressed beyond said limited resistance, and a substantially U-shaped guiding tube arranged near one end of said insulator for guiding said rod-shaped structure from the outside into the interior of said insulator.

9. In a rheostat comprising a heat-resistant carrier of insulating material, resistance windings on said carrier, an insulating slide bar arranged in parallel relation to said carrier, a slide contact movably disposed on said insulating bar so as to conductively engage said windings, a flexible supply conductor having one end stationary and the other end conductively connected with said slide contact, said supply conductor consisting of a rod-shaped helical structure of limited resistance to bending stresses and capable of flexible bending when stressed beyond said limited resistance so as to have the tendency to stay taut in all positions of said slide contact.

10. In a rheostat comprising a heat-resistant carrier of insulating material, resistance windings on said carrier, a slide bar arranged above said carrier, a slide contact movably disposed on said slide bar so as to conductively engage said windings, a flexible supply conductor having one end stationary and the other end conductively connected with said slide contact, and a device for tauntening said supply conductor, said device comprising a spring and a pulley both arranged underneath said carrier, said pulley engaging said supply conductor and connected with said spring, and means for guiding said supply conductor from said slide contact to said pulley.

11. In a variable resistor as set forth in claim 3, said series-connected resistance conductors consisting of wires coated with an enamel insulation and having an additional insulation covering said enamel insulation and consisting of spun glass fiber, said enamel insulation and said glass fiber insulation being interrupted at the path of travel of the aforesaid slide contact.

ROBERT ABRAHAMSON.